United States Patent Office 2,914,151
Patented Nov. 24, 1959

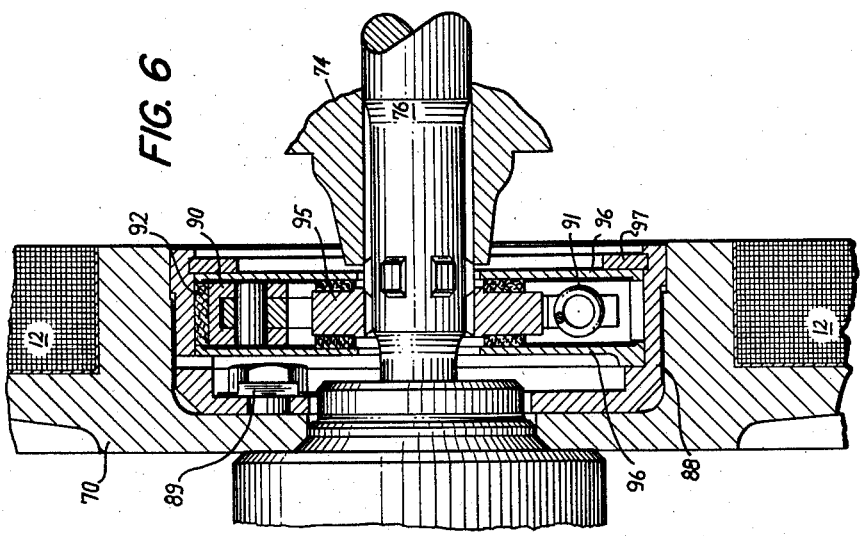
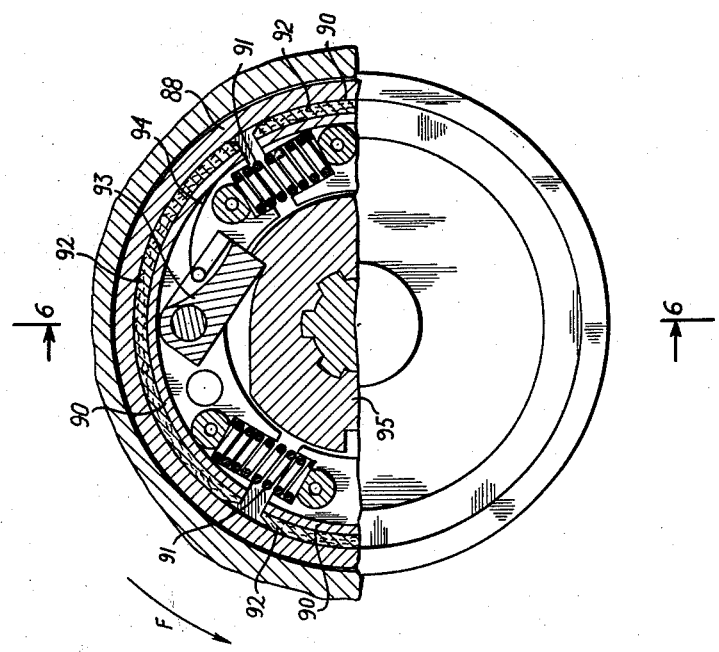

2,914,151

ELECTROMAGNETIC CLUTCH AND CONTROL THEREFOR

Jean Maurice, Ablon, and Michel Rist, Paris, France, assignors to Societe Anonyme Francaise du Ferodo, Paris, France, a corporation of France Application November 16, 1954, Serial No. 469,262

Claims priority, application France November 17, 1953

5 Claims. (Cl. 192—3.5)

The present invention relates to electro-magnetic clutches of the kind in which the torque which can be transmitted is in direct proportion to the current applied to the operating coil of the clutch.

In clutches of this kind, when the vehicle is stationary, no braking action from the compression of the engine is applied to it because of the break in the vehicle transmission due to the de-coupling of the clutch. In order to overcome this drawback, it has already been proposed to connect the clutch coil to the accumulator battery when the vehicle is stationary. The consumption of current thus caused during stationary periods is, however, high and is thus hardly acceptable.

The present invention has for its object improvements in electro-magnetic clutches of the kind referred to, which remove these drawbacks, these improvements being characterised by means intended to be made operative mainly during stationary periods and arranged so that a torque slightly greater than the torque developed by the compression of the engine can be transmitted between the shafts of the clutch.

In accordance with the invention mechanical means are arranged so as to introduce a frictional couple between the shafts of the clutch when the vehicle is stationary. A frictional effect of this kind may be applied at a point close to the friction linings of the clutch or to surfaces mounted in parallel with the said linings. In addition, a supplementary braking torque may be provided between a surface which is directly or indirectly fixed to the delivery shaft of the clutch and a fixed abutment.

Further objects, features and advantages of the invention will also be brought out in the description which follows below of certain forms of embodiment, selected by way of example, with reference to the attached drawings, in which:

Fig. 5 is a partial view of still another form of clutch, half in cross-section and half in elevation, following the chain-dotted lines 5—5 shown in Fig. 6;

Fig. 6 is a corresponding view in cross-section following the lines 6—6 of Fig. 5.

Figure 1:
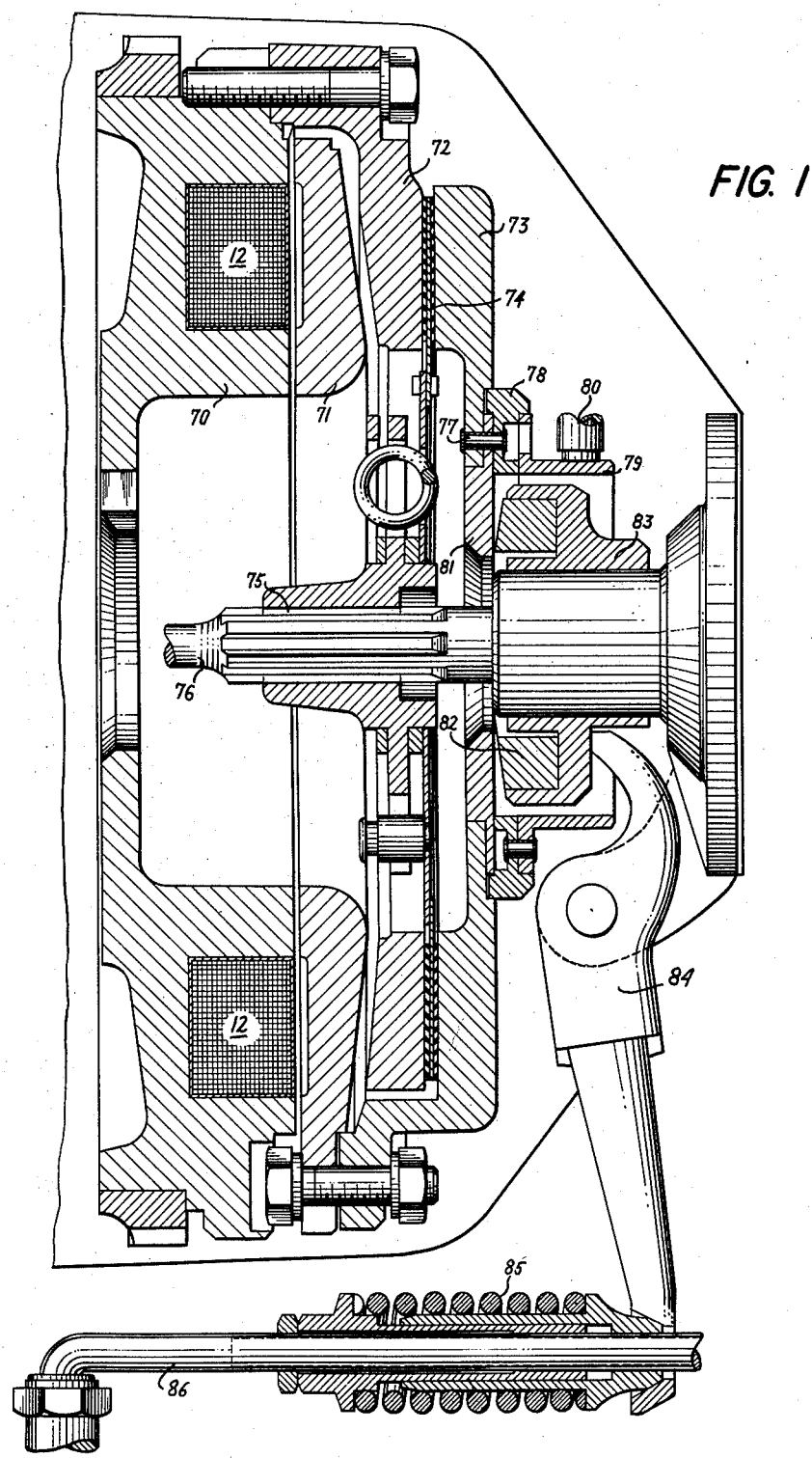
Fig. 1 is a view in longitudinal cross-section of a form of embodiment of the clutch.
Figure 1A:
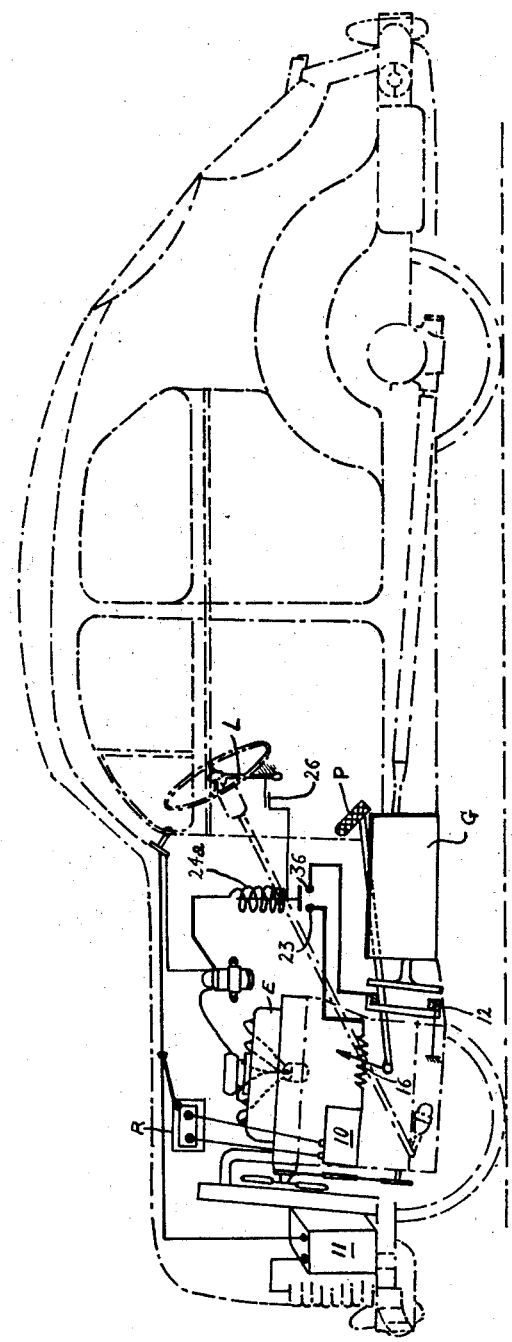
Fig. 1a shows diagrammatically an automotive vehicle with a clutch, according to the invention.

In the embodiment shown in Figs. 1 and 1a, which refers by way of example to an application of the invention to an automotive vehicle provided with an internal combustion variable-speed engine, there is shown in Fig. 1a at 10 the dynamo driven from the crank-shaft of the said engine E, and at 11 the accumulator battery. The dynamo 10 and the battery 11 are those which form part of the usual equipment of an automotive vehicle and carry out all the usual functions with the normal connections, in particular with a make-and-break switch and/or a voltage regulator R. There is seen in Fig. 1a, at 12, the operating coil of the electro-magnetic clutch, this clutch being engaged when the coil 12 is adequately supplied with current and is disengaged when the current applied to it is below a certain value, the gripping effect on the linings of the clutch and the torque which can be transmitted being directly proportional to the value of the electric current supplied to the coil 12. There is shown at 26 a switch built into a gear-changing shift lever L which actuates the shiftable gear transmission, i.e., the gear-box G of the vehicle. The switch 26 is closed when the lever L is grasped by the user for changing gears, and is open when the lever L is released.

One of the terminals of the dynamo 10 is connected to the resistance element 16 of a rheostat which is controlled directly or indirectly by the accelerator pedal P so as to introduce into the circuit a portion of resistance which becomes smaller as the accelerator is pressed further down. The resistance 16 is connected to a terminal 23 of a relay, the coil 24a of which has one extremity connected to ground by a conductor 23 including the aforesaid switch 26. The other end of the coil 24a is connected to the battery 11. The other terminal 36 of the relay 24a is adapted to feed the clutch coil 12. The yoke 70 of the electromagnetic coil 12 is rigidly coupled to the driving shaft and co-operates (Fig. 1) with an armature 71. The latter is fixed for rotation but free to move laterally with respect to the yoke 70, preferably by means of flexible tangential tongues (not shown). The yoke 70 and the armature 71 are respectively coupled rigidly to two plates 72 and 73 intended to grip between them a friction disc 74 mounted on splines 75 cut in the driven shaft 76 which forms the primary shaft of the gear-box.

The friction linings 74 are such that the air-gap between the yoke and the armature is never reduced to zero, even after prolonged wear of the friction disc.

The exterior plate 73 has riveted to it at 77 a ring 78 to which is fixed an electrically insulated collector ring 79 passing round the shaft 76 and connected to the coil 12, a current supply brush 80 being associated with the ring 79. If required, a second collector ring may be provided to ensure the return to ground of the current from the coil 12. The rivets 77 are also used to fix a polished annular member 81 to the plate 73 on which it is centered. Against the member 81 is arranged a graphited thrust ring 82 or the like, enclosed in a thrust block 83 which is housed inside the collector ring 79. The faces of the thrust ring 82 which are applied against the member 81, are arranged at the front and the rear of the plane of this figure. A lever 84 is arranged so as to apply the assembly 83, 82 against the member 81 and is connected by means of a calibrated spring 85 to a member 86 which is intended to be operated at will by the user.

During normal running, the member 86 is released and the thrust ring 82 does not apply any force against the member 81 and thus does not modify the operation of the electro-magnetic clutch, such as has been previously described.

When it is desired to park the vehicle, the engine is stopped, a gear is engaged and the member 86 is operated. The thrust ring 82 pushes the member 81 and, in consequence, the plate 73, towards the plate 72 which grips the linings of the friction disc 74. The gripping force is regulated by the spring 85 and the latter is calibrated in such manner that the torque which can be transmitted by the plates 72 and 73 and the friction disk 74 is slightly greater than the torque due to the compression of the engine. The vehicle is thus immobilised during parking. It is to be noted that with an electromagnetic clutch the relative displacement of the plates 72 and 73 is very small. The travel of the ring 83 which is required to grip the friction linings is thus also quite small, and this enables a large force to be applied without difficulty at 86 with an admissible travel.

If a breakdown occurs in the dynamo, the vehicle may be started up with a certain degree of progression by actuating the member 86, by virtue of the slip between the friction disc 74 and the plates 72 and 73; it will then suffice to energise the coil 12 from the battery and to release the member 86 so as to bring the vehicle to a garage. By the provision of a thrust member on the elastic transmission 86, the effort applied to the member 81 may be sufficiently increased to transmit the full torque and thus to compensate for an exceptional failure of the battery.

Figure 2:
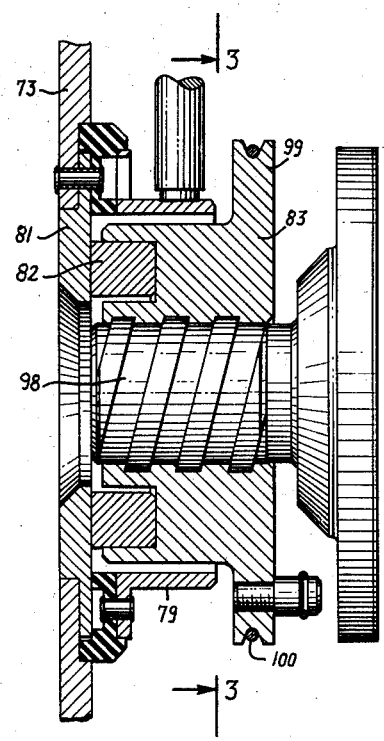
Fig. 2 is a view similar to a part of Fig. 1, but which shows a modified detail in cross-section following the line 2—2 of Fig. 3.
Figure 3:
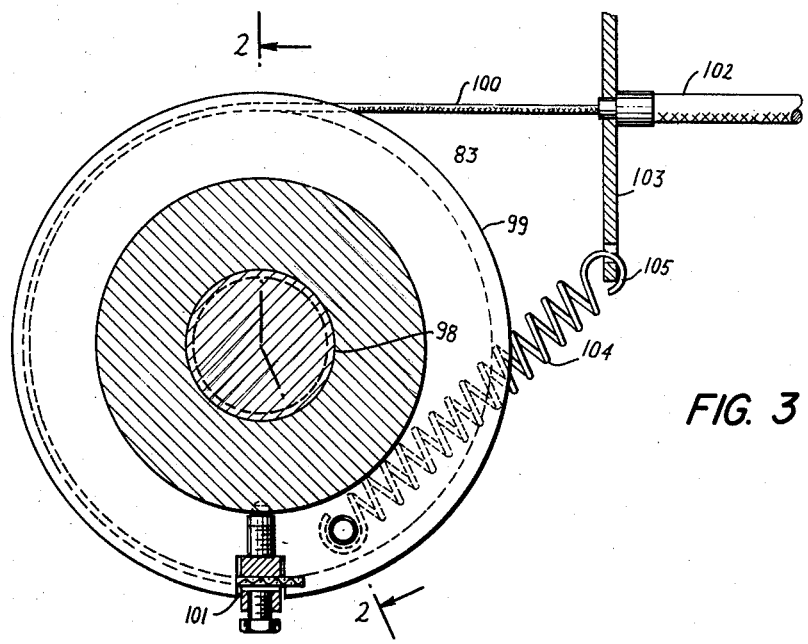
Fig. 3 is a partial corresponding view in elevation following the line 3—3 of Fig. 2.

In an alternative form shown in Figs. 2 and 3, the arrangement is similar to that which has just been described with reference to Fig. 1, and there will be recognized at 82 the graphited thrust ring intended to be applied against the member 81 which is fixed to the plate 73, and at 83 the thrust block in which the thrust ring 82 is housed. However, the thrust block 83 is in this case screwed round a fixed ram 98 having a helicoidal thread, and is fixed to a grooved pulley 99. Around the pulley 99 is wound a cable 100 which is fixed at 101 to the pulley and is engaged in a sheath 102 abutting against a fixed support 103. A return spring 104 is coupled between the pulley 99 and a fixed point 105. The operation of this arrangement is similar to that which has already been described. It will be appreciated that the radial space occupied by the control is small, which enables the provision of a collector ring 79 of any length which may be required, whilst providing an excellent centering of the control members.

Figure 4:
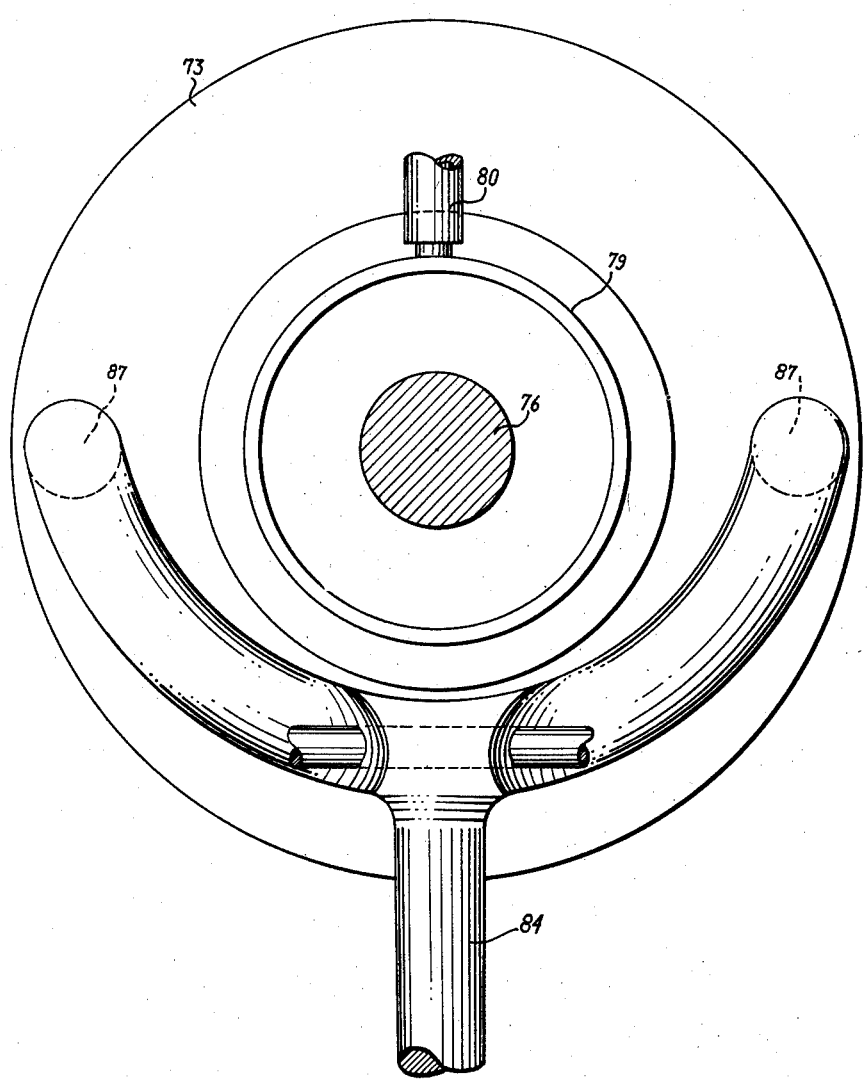
Fig. 4 is a partial view looking on the end of a further alternative form of the clutch.

In a further alternative form shown in Fig. 4, the arrangement is again similar to that of Fig. 1, and there will be recognised at 76 the driven entry shaft of the gear box, at 79 the collector ring and at 80 the current supply brush.

The lever 84 is however modified, and has the shape of a fork, the extremities of which comprise friction-contact surfaces 87 of suitable area which act directly against the external pressure plate 73. When the lever 84 is actuated, this arrangement enables not only the transmission at 72—74—75 of a torque slightly greater than the torque due to the engine compression, but further permits, if the effort applied to the lever 84 is increased, of the use of a torque greater than the braking torque of the engine, in order to immobilise the vehicle. The friction at 87 between a member of the clutch and a fixed point enables this torque to be increased to any desired extent since, by increase of the pressure applied by the plate 73 on the friction disc, the torque which can be transmitted by the latter is also increased at the same time. The electrical conductors (not shown) which connect the coil 12 to the collector 79 are mounted below the surface level of the external face of the plate 73 so as not to interfere with the operation of the contact surfaces 87. With the arrangement of Fig. 4, safety during stationary periods is thus increased.

Reference will now be made to Figs. 5 and 6 in which a further alternative form of embodiment is shown. There will be recognised in Figs. 5 and 6, the yoke 70 rigidly fixed to the driving shaft together with the coil 12, and at 76 the driven entry shaft of the gear-box with which the friction disc 74 is fixed in respect of rotation.

In the central space formed in the yoke 70 there is housed a torque-limiting device mounted between the yoke 70 and the driven shaft 76. In accordance with this arrangement, a drum 88 is fixed to the yoke at 89 and forms an internal cylindrical friction track.

Inside the drum 88 is mounted a set of three segments, shown at 90 and spaced apart from each other by means of springs 91. Each segment 90 has a U-shaped section and is provided externally with a friction lining 92 which remains constantly applied against the drum 88 by means of the springs 91. Upon each segment, there is rotatably mounted between the flanges a pawl 93 which is urged towards the axis of the clutch by a spring 94. This pawl is directed in the opposite sense to the direction of rotation F of the engine (see Fig. 5), so as to extend towards the rear of its pivot, and it co-operates with a ratchet 95 mounted on the driven shaft 76. The ratchet 95 and the segments 90 are retained in a fixed axial position with respect to the drum 88 by two end-cheeks 96 and a locking ring 97.

When the engine rotates, the segments 90 are permanently driven by the drum. The centrifugal force keeps the pawls 93 out of engagement with the teeth of the ratchet 95 against the action of the springs 94. The limiting device is inoperative and the conditions of working during normal running are the same as those which have been previously described.

When the engine and the vehicle are both stopped with a view to parking, the pawls 93 pivot inwards under the action of the springs 94 and come into contact with the teeth of the ratchet 95. This locks the segments 90 for rotation with the driven shaft 76 in the direction selected for the pawls and which has been indicated above. The torque transmissible at 90—92—88, which is mainly determined by the strength of the springs 91, is chosen so as to be slightly greater than the torque due to the compression of the engine. It is sufficient to engage a suitable gear, for example a forward gear on a downward slope or a reverse gear on an upward slope, so that the vehicle may be immobilized by the engine. It will thus be appreciated that the arrangement which has just been described does not require any operation other than the intuitive engagement of a gear in order to become operative when the vehicle is stationary.

This arrangement also has other advantageous features. When the vehicle is in motion and the engine stalls during changing gears, the pawls 93 engage with the ratchet 95, but the possibility of slip in the system 90—92—88 avoids dangerous chocks on the transmission and removes any risk of slip of the driving wheels at the moment when the engine is once more coupled to these latter. It will be understood, however, that the couple which can be transmitted at 90—92—88, which is arranged to be slightly greater than the torque due to the compression of the engine, automatically ensures re-starting of the engine if there is applied to the vehicle a tractive effort sufficient to exceed this torque.

It will, of course, be understood that the invention is not restricted to the forms of embodiment which have been described and shown, but includes in its scope all other alternative forms embodying the same basic principles.

What we claim is:

1. In an automobile vehicle having an internal combustion engine, an electro-magnetic clutch of the kind in which the torque transmissible by the said clutch varies directly in accordance with the current supplied to the operating coil of the electro-magnet of said clutch, and comprising: a driving shaft, a driven shaft, and mechanical means for enabling the transmission between said driving and driven shafts of a torque at least equal to that produced by the compression of the engine of said vehicle, said means including a plurality of friction members disposed between said driving shaft and said driven shaft and mounted in parallel with the friction disc of said clutch, elastic means for coupling together said friction members, a corresponding plurality of centrifugally-actuated spring-loaded pawls, and a ratchet-toothed member mounted on the said driven shaft internally of and co-operating with said pawls, whereby, when the said driven shaft stops and the vehicle and engine are stationary, the said pawls engage said ratchet to bring said friction members into contact to transmit the resistive torque due to compression of the engine.

2. An electro-magnetic clutch as claimed in claim 1, in which the said friction members are gripped between a drum rigidly fixed to the said driving shaft and intermediate pawl-carrying members, the co-operating ratchet wheel being rigidly fixed to the said driven shaft.

3. A clutch control apparatus for braking a vehicle, which includes a variable-speed engine, a shiftable gear transmission having a shift member selectively operable to engage the gears of the transmission, an electromagnetic clutch for coupling the engine to the transmission, the clutch being of the type in which the torque transmissible varies directly in accordance with the current supplied to it and having a rotatable driving member, and a driven member; said clutch control apparatus comprising a friction element for coupling the driven member with the driving member, a control device acting mechanically on the friction element to couple the driving member to the driven member when the engine is not running and the vehicle is stationary, and means for automatically rendering the control device effective to couple the driving and driven members when the transmission gears are engaged by the shift member, whereby when the gear transmission is engaged by the shift member the vehicle is braked by the engine through the coupling between said driving and driven members.

4. A clutch control apparatus for braking a vehicle, which includes a variable-speed engine, a shiftable gear transmission having a shift member selectively operable to engage the gears of the transmission, an electromagnetic clutch for coupling the engine to the transmission, the clutch being of the type in which the torque transmissible varies directly in accordance with the current supplied to it and having a rotatable driving member, and a driven member; said clutch control apparatus comprising a friction element for coupling the driven member with the driving member, a control device including a movable thrust member cooperative with the driving member and acting mechanically on the friction element to couple the driving member to the driven member when the engine is not running and the vehicle is stationary, and actuating means for rendering the thrust member effective to effect coupling of the driving and driven members when the transmission gears are engaged by the shift member, whereby when the gear transmission is engaged by the shift member the vehicle is braked by the engine through the coupling between said driving and driven members.

5. A clutch control apparatus according to claim 4, in which said actuating means comprises a rotatively driven worm screw supporting the thrust member, and means for rotatively driving the screw selectively in a direction for rendering the thrust member effective in response to manipulation of the shift gear.

References Cited in the file of this patent

UNITED STATES PATENTS

| | | |
|---|---|---|
| 726,536 | Holz | Apr. 28, 1903 |
| 1,403,819 | Stowers | Jan. 17, 1922 |
| 1,601,001 | Sleeper | Sept. 28, 1926 |
| 1,848,091 | Winther | Mar. 1, 1932 |
| 2,368,304 | Kattwinkel | Jan. 30, 1945 |
| 2,548,207 | Dunn | Apr. 10, 1951 |
| 2,591,989 | Winther | Apr. 8, 1952 |
| 2,601,076 | Winther et al. | June 17, 1952 |
| 2,688,388 | Gill | Sept. 7, 1954 |
| 2,695,695 | Gilfillan et al. | Nov. 30, 1954 |